United States Patent
Hashemzadeh

(10) Patent No.: US 8,871,844 B2
(45) Date of Patent: Oct. 28, 2014

(54) COMPOSITE PARTICLES HAVING ORGANIC AND INORGANIC DOMAINS

(75) Inventor: Abdulmajid Hashemzadeh, Burgkirchen (DE)

(73) Assignee: Wacker Chemie AG, Munich (DE)

(*) Notice: Subject to any disclaimer, the term of this patent is extended or adjusted under 35 U.S.C. 154(b) by 166 days.

(21) Appl. No.: 13/509,479

(22) PCT Filed: Nov. 10, 2010

(86) PCT No.: PCT/EP2010/067197
§ 371 (c)(1),
(2), (4) Date: May 11, 2012

(87) PCT Pub. No.: WO2011/058051
PCT Pub. Date: May 19, 2011

(65) Prior Publication Data
US 2012/0232214 A1  Sep. 13, 2012

(30) Foreign Application Priority Data
Nov. 12, 2009  (DE) .................. 10 2009 046 664

(51) Int. Cl.
*B60C 1/00* (2006.01)
*C08K 5/24* (2006.01)
*C09C 1/30* (2006.01)

(52) U.S. Cl.
CPC ........... *C09C 1/3072* (2013.01); *C01P 2004/62* (2013.01)
USPC ....................................... 524/262

(58) Field of Classification Search
USPC ....................................... 524/262
See application file for complete search history.

(56) References Cited

U.S. PATENT DOCUMENTS

| | | | |
|---|---|---|---|
| 3,433,780 A | 3/1969 | Cekada et al. | |
| 3,544,500 A | 12/1970 | Osmond et al. | |
| 4,421,660 A | 12/1983 | Solc nee Hajna | |
| 4,857,582 A | 8/1989 | Wolfgruber et al. | |
| 5,281,657 A | 1/1994 | Mautner et al. | |
| 6,517,941 B1 | 2/2003 | Murase | |
| 6,620,516 B1 | 9/2003 | Kurihara et al. | |
| 6,756,437 B1 | 6/2004 | Xue et al. | |
| 6,833,401 B1 | 12/2004 | Xue et al. | |
| 2004/0156994 A1 | 8/2004 | Wiese et al. | |
| 2004/0171728 A1 | 9/2004 | Xue et al. | |
| 2007/0161740 A1 | 7/2007 | Wiese et al. | |
| 2008/0021147 A1 | 1/2008 | Lin | |
| 2008/0051500 A1 | 2/2008 | Wiese | |
| 2008/0098933 A1 | 5/2008 | Killat | |
| 2008/0281035 A1 | 11/2008 | Hashemzadeh et al. | |
| 2009/0250183 A1* | 10/2009 | Hayes et al. | ............ 162/168.1 |
| 2009/0317626 A1 | 12/2009 | Tiarks et al. | |
| 2010/0144925 A1 | 6/2010 | Cabrera et al. | |
| 2011/0015340 A1* | 1/2011 | Hashemzadeh | ............ 524/588 |
| 2011/0201727 A1 | 8/2011 | Hashemzadeh et al. | |

FOREIGN PATENT DOCUMENTS

| | | |
|---|---|---|
| DE | 19942777 A1 | 3/2001 |
| DE | 10129537 A1 | 1/2003 |
| DE | 102004010155 A1 | 9/2005 |
| DE | 102006006265 A1 | 8/2007 |
| DE | 102006050336 A1 | 5/2008 |
| DE | 102007038333 A1 | 2/2009 |
| EP | 1043372 A1 | 10/2000 |
| EP | 1243619 A1 | 9/2002 |
| EP | 1431356 A2 | 6/2004 |
| WO | 01/18081 A1 | 3/2001 |
| WO | 2006072464 A1 | 7/2006 |
| WO | 2007057382 A1 | 5/2007 |
| WO | 2008009596 A1 | 1/2008 |
| WO | 2008040464 A1 | 4/2008 |

OTHER PUBLICATIONS

Fox T. G., Bull. Am. Physics Soc. 1, 3, p. 123 (1956).
Polymer Handbook 2nd Edition, J. Wiley & Sons, New York (1975).
Dong-ming Qi, J. of Applied Polym. Sci., 2006, vol. 99, p. 3425-3432.
Dong-ming Qi, Colloid Polymer Sci. 2008, vol. 286, p. 233-241.
Tsutomu Mizutani, J. of Applied Polym. Sci., 2006, vol. 99, p. 659-669.
Frank Bauer, Macromol. Mat. Eng., 2006291, p. 493-498.
Noll, Chemie and Technologie der Silikone, 2. Auflage 1968, Weinheim.
Houben-Weyl, Methoden der organischen Chemie, Band E20, Georg Thieme Verlag, Stuttgart (1987).
Mensah, Laure, International Search Report dated Feb. 16, 2011, for PCT Application No. EP2010/067197.

* cited by examiner

*Primary Examiner* — Angela C Scott
(74) *Attorney, Agent, or Firm* — RatnerPrestia

(57) ABSTRACT

Composite particles obtained by converting a) one or more inorganic oxide particles having an average diameter of <1000 nm, b) one or more organic polymers, and c) one or more coupling reagents, the oxide particles a) and organic polymers b) being linked by units of coupling reagents c), wherein one or more polymers of α) one or more ethylene unsaturated monomers selected from vinyl esters of carbolic acids having 1 to 15 C atoms, methacrylic acid esters or acrylic acid esters of carbolic acids having unbranched or branched alcohols having 1 to 15 C atoms, and olefins, vinyl aromatics, and vinyl halogenides, and β) one or more ethylene unsaturated carbolic acids having 3 to 11 C atoms, and optionally γ) one or more monomers comprising at least two ethylene unsaturated groups, and optionally δ) one or more further ethylene unsaturated monomers are used as the organic polymers b).

15 Claims, No Drawings

COMPOSITE PARTICLES HAVING ORGANIC AND INORGANIC DOMAINS

CROSS-REFERENCE TO RELATED APPLICATIONS

This application is the national phase filing of international patent application No. PCT/EP2010/067197, filed 10 Nov. 2010, and claims priority of German patent application number 10 2009 046 664.9, filed 12 Nov. 2009, the entireties of which applications are incorporated herein by reference.

FIELD OF THE INVENTION

The present invention provides composite particles based on inorganic oxides, organopolymers and coupling reagents, processes for production of the composite particles, and for the use thereof, for example as an additive, binder or cobinder.

BACKGROUND OF THE INVENTION

Composite particles contain organic and inorganic units or domains, for example organic polymer units and particles of inorganic oxides fixed thereon, and typically have diameters of 4 to 5000 nm.

In standard processes for production of composite particles, organic monomers are polymerized by means of emulsion polymerization in aqueous dispersions of inorganic particles, the intention being to anchor organic domains on the surface of the inorganic particles, as described, for example, in Dong-Ming Qi, J. of Applied Polym. Sci., 2006, Vol. 99, pages 3425 to 3432; Dong-Ming Qi, Colloid Polymer Sci. 2008, Vol. 286, pages 233 to 241; Tsutomu Mizutani, J. of Applied Polym. Sci., 2006, Vol. 99, pages 659 to 669; Frank Bauer, Macromol. Mater. Eng., 2006291, pages 493 to 498, or in DE-A 10 2004 010 155, U.S. Pat. No. 3,544,500, U.S. Pat. No. 4,421,660, WO-A 2006/072464, DE-A 10129537, WO-A 01/18081, U.S. Pat. No. 6,833,401, DE-A 19942777, EP-1431356 or WO-A 2008/009596. Also known is the free-radically initiated polymerization of ethylenically unsaturated, silane-containing monomers in the presence of polyvinyl alcohols, as described, for example, in WO-A 2007/057382. DE-A 102007038333 discloses compositions which have been produced by condensation of silicon compounds in the presence of polyvinyl alcohols, wherein the inorganic particles formed have explicitly not been fixed to the polyvinyl alcohols, but were present alongside the polyvinyl alcohols in the form of a blend, which leads to a high water solubility of the composition.

The fixing of the organic and inorganic domains of the composite particles and the provision of stable dispersions of composite particles present problems. This is because the inorganic or organic constituents usually have different polarities and tend to separate from one another and each agglomerate among one another. If such an agglomeration occurs before or during the production of the composite particles, for example, the agglomerated inorganic particles are encapsulated by the organic constituents, and so there is no homogeneous fixing of inorganic particles on the organic constituents, and hence ultimately no formation of chemically homogeneous composite particles formed from organic and inorganic domains. Corresponding mixtures are not present in the form of colloidal primary particles in solvents. It may even be the case that the inorganic particles and the organic constituents are present as a blend alongside one another.

However, there may also be agglomeration of the inorganic or organic domains in composite particles formed homogeneously from inorganic and organic domains, which leads to inadequate storage stability, especially of dissolved, emulsified or dispersed composite particles, and is manifested by gelation or speck formation. Such agglomeration occurs especially at relatively high temperatures, for example from 40° C. Aqueous dispersions of particles formed exclusively from inorganic units, for example colloidal silica or organopolysiloxanes, likewise tend to agglomerate at relatively high temperatures, for example at 70° C., or even at room temperature.

Agglomerated composite particles no longer have the desired performance properties or are even entirely unusable. In order to provide, for example, stable aqueous dispersions of composite particles, emulsifiers, protective colloids or specific additives are typically added as stabilizers, for example the hydroxyl-containing alkylamino compounds recommended in DE-A 10 2004 010 155.

WO-A 2008/040464 recommends, for renders or paints, the use of colloidal silica and polymer dispersions based on vinyl esters or (meth)acrylic esters, ethylenically unsaturated carboxylic acids and ethylenically unsaturated, emulsifying monomers. However, such systems do not achieve the water resistance required in many applications. EP-A 1043372 discloses coating compositions for paper, which comprise colloidal silica particles and copolymers with considerable proportions of monomer units bearing carboxylic acid groups. Due to the composition of the copolymers or coating compositions, corresponding coatings are alkali-soluble and hence recyclable. In many applications, however, water resistance under alkaline conditions is also required. Furthermore, copolymers with high contents of monomer units bearing carboxylic acid groups are highly viscous, which presents difficulties in applications and can necessitate working in dilutions, i.e. at low solids contents. EP-A 1243619 discloses composite materials consisting of organic domains, such as polyacrylic acid, and inorganic domains, for example sodium silicates or colloidal silicas, the organic and inorganic domains being linked by ionic interactions with divalent metal cations, such that the composite materials are present as aggregates of the polymeric domains in the form of gels.

SUMMARY OF THE INVENTION

It was an object of the present invention to provide composite particles which do not have the abovementioned disadvantages, and which more particularly are storage-stable even in the form of dispersions, ideally even without use of stabilizers.

The object has been achieved, surprisingly, with composite particles in which oxide particles and organopolymers bearing carboxylic acid groups are linked by means of coupling reagents containing alkoxysilane groups, and organopolymers with relatively high contents of units bearing carboxylic acid groups additionally contain units of polyethylenically unsaturated monomers.

DETAILED DESCRIPTION OF THE INVENTION

The invention provides composite particles obtainable by conversion of a) one or more inorganic oxides (oxide particles) having a mean diameter of <1000 nm, b) one or more organopolymers and c) one or more coupling reagents, oxide particles a) and organopolymers b) being joined to one another via units of coupling reagents c), characterized in that the organopolymers b) used are one or more polymers of α) one or more ethylenically unsaturated monomers selected from the group comprising vinyl esters of carboxylic acids having 1 to 15 carbon atoms, methacrylic esters or acrylic esters of carboxylic acids with unbranched or branched alcohols having 1 to 15 carbon atoms and olefins, vinylaromatics and vinyl halides, and β) one or more ethylenically unsaturated carboxylic acids having 3 to 11 carbon atoms, and optionally γ) one or more monomers containing at least two ethylenically unsaturated groups and optionally δ) one or more further ethylenically unsaturated monomers, with the provisos that the organopolymers b) contain at least 91% by weight of units of monomers α) and β), and that the organopolymers b) contain units of one or more monomers γ) provided that the organopolymers b) contain more than 4.9% by weight of units of the ethylenically unsaturated carboxylic acids β), where the figures in % by weight are based in each case on the total weight of the organopolymers b), and the coupling reagents c) are selected from the group comprising c1) one or more alkylalkoxysilanes whose alkyl groups have at least one amino, epoxy, mercapto or isocyanate group, and c2) one or more unsaturated alkoxysilanes and additionally one or more ethylenically unsaturated organomonomers containing at least one functional group selected from the group comprising carboxylic acid groups or derivatives thereof, sulfo groups, epoxy groups and hydroxyl groups.

In the composite particles, the oxide particles a) and the organopolymers b) are linked via covalent bonds, essentially via units of the coupling reagents c).

The oxide particles a) are, for example, metal oxides or semimetal oxides which may optionally contain organic groups.

Preferred semimetal oxides are silicon oxides. In the case of the metal oxides, preference is given to the oxides of the metals aluminum, titanium, zirconium, tantalum, tungsten, hafnium, zinc and tin. In the case of the silicon oxides, preference is given to colloidal silica, fumed silica, precipitated silica, silica sols, silicates or else organopolysiloxanes. In the case of the metal oxides, particular preference is given to aluminum oxides such as corundum, aluminum mixed oxides with other metals and/or silicon, titanium oxides, zirconium oxides, iron oxides.

The silicon oxides consist more preferably of units of the general formula

$$R^1_x Si(OR^2)_y O_{(4-x-y)/2} \qquad (I)$$

in which x is 0, 1, 2 or 3 and y is 0, 1 or 2, with the proviso that the sum of x+y≤3, $R^1$ is an SiC-bonded monovalent hydrocarbyl radical having 1 to 18 carbon atoms, $R^2$ is a hydrogen atom or a hydrocarbyl radical which has 1 to 18 carbon atoms and may be interrupted by one or more separate oxygen atoms, or a radical of the formula —COCH$_3$, —COC$_2$H$_5$ or —CH$_2$CH$_2$OH, where the individual $R^1$, $R^2$ and x and y are each defined independently of one another.

Examples of hydrocarbyl radicals $R^1$ are alkyl radicals such as the methyl, ethyl, n-propyl, isopropyl, n-butyl, sec-butyl, amyl, hexyl, β-ethylhexyl, heptyl, octyl, isooctyl and octadecyl radical; alkenyl radicals such as the vinyl and allyl radical and butenyl radicals; alkynyl radicals; cycloalkyl radicals such as the cyclobutyl and cyclohexyl radical and methylcyclohexyl radicals; aryl radicals such as the phenyl radical; alkaryl radicals such as tolyl radicals; and aralkyl radicals such as the benzyl radical. Particular preference is given to the methyl, ethyl, vinyl and phenyl radical.

Examples of substituted hydrocarbyl radicals $R^1$ are halogenated hydrocarbyl radicals such as chloromethyl, 3-chloropropyl, 3-bromopropyl, 3,3,3-trifluoropropyl and 5,5,5,4,4,3,3-heptafluoropentyl radical, and the chlorophenyl, dichlorophenyl and trifluorotolyl radical; mercaptoalkyl radicals such as the 2-mercaptoethyl and 3-mercaptopropyl radical; cyanoalkyl radicals such as the 2-cyanoethyl and 3-cyanopropyl radical; aminoalkyl radicals such as the 3-aminopropyl, N-(2-aminoethyl)-3-aminopropyl and N-(2-aminoethyl)-3-amino(2-methyl)propyl radical; aminoaryl radicals such as the aminophenyl radical; acyloxyalkyl radicals such as the 3-acryloyloxypropyl and 3-methacryloyloxypropyl radical; hydroxyalkyl radicals such as the hydroxypropyl radical; and radicals of the formula HOCH$_2$CH(OH)CH$_2$SCH$_2$CH$_2$—, HOCH$_2$CH$_2$OCH$_2$—; or glycidyl ethers, especially propyl glycidyl ether.

Preferably, $R^2$ is a hydrogen atom or identical or different alkyl- or alkoxyalkylene radicals having 1 to 4 carbon atom(s) per radical. Examples of hydrocarbyl radicals $R^2$ are alkyl radicals such as the methyl, ethyl, n-propyl, isopropyl, n-butyl, sec-butyl and tert-butyl radical; and alkoxyalkylene radicals such as the methoxyethylene and ethoxyethylene radical. Particular preference is given to the methyl and ethyl radical.

Preferably, x in the formula I is an average of 0.1 to 2.0 and y is an average of 0 to 0.5.

The particle size of the oxide particles a) is preferably from 2 nm to 500 nm, more preferably 5 nm to 100 nm and most preferably 10 nm to 70 nm (determined by means of transmission electron microscopy; with the Libra 120 instrument from Zeiss).

The oxide particles a) may be present in monomodal form, i.e. as a mixture of particles with homogeneous particle size, in bimodal form, i.e. as a mixture of particles whose particle size distribution has two maxima, or in polymodal form, i.e. as a mixture of particles which do not have a mono- or bimodal particle size distribution.

For production of the composite particles, the oxide particles a) are used preferably to an extent of 9 to 80% by weight, more preferably 20 to 60% by weight and most preferably 30 to 50% by weight, based in each case on the total mass of components a), b) and c) for production of the composite particles.

The oxide particles a) are commercial products or are producible by standard methods, as described, for example, in U.S. Pat. No. 3,433,780, U.S. Pat. No. 4,857,582, U.S. Pat. No. 5,281,657, in Noll, Chemie and Technologie der Silikone [Chemistry and Technology of the Silicones], 2nd edition 1968, Weinheim, or in Houben-Weyl, Methoden der organischen Chemie [Methods of Organic Chemistry], volume E20, Georg Thieme Verlag, Stuttgart (1987). Oxide particles a) in the form of colloidal aqueous dispersions are obtained, for example, by hydrolyzing organosilicon compounds, such as silanes of the formula $R^1_x Si(OR^2)_{4-x}$ in which x, $R^1$ and $R^2$ are each as defined above, and/or partial hydrolyzates thereof.

For preparation of the organopolymers b), preferably vinyl esters of carboxylic acids having 1 to 12 carbon atoms, more preferably vinyl esters of carboxylic acids having 1 to 8 carbon atoms and most preferably vinyl esters of carboxylic acids having 1 to 6 carbon atoms are used. Examples of suitable vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 5 to 13 carbon atoms, for example VeoVa9R or VeVa10R (tradenames of Shell). Preference is given to vinyl acetate.

Methacrylic esters or acrylic esters are preferably esters of unbranched or branched alcohols having 1 to 12 carbon atoms, more preferably 1 to 8 carbon atoms and most preferably 1 to 1 to carbon atoms. Examples of preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate.

The olefins, vinylaromatics and vinyl halides preferably have 1 to 12 carbon atoms and more preferably 1 to 9 carbon atoms and most preferably 18 carbon atoms.

Preferred olefins are ethylene and propylene. Preferred vinylaromatics are styrene and vinyltoluene. A preferred vinyl halide is vinyl chloride.

The monomers α) preferably do not have any hydrophilic groups. Hydrophilic groups may be non-ionic, such as polyglycol groups, or anionic, such as sulfate, sulfonate, phosphate or phosphonate groups, or cationic, such as ammonium groups.

The ethylenically unsaturated carboxylic acids β) preferably have 3 to 9 carbon atoms, more preferably 3 to 8 carbon atoms and most preferably 3 to 6 carbon atoms. Preferred monomers β) are, for example, ethylenically unsaturated mono- or dicarboxylic acids, such as acrylic acid, methacrylic acid, crotonic acid, itaconic acid, fumaric acid or maleic acid, monoesters of fumaric acid or maleic acid, such as the monoethyl and monoisopropyl esters. Particularly preferred monomers β) are ethylenically unsaturated monocarboxylic acids, such as methacrylic acid, acrylic acid or crotonic acid. Most preferred are methacrylic acid and crotonic acid.

The monomers γ) have preferably 2 to 10 ethylenically unsaturated groups and more preferably two to 4 ethylenically unsaturated groups. Suitable monomers γ) are, for example, divinyl compounds, di(meth)acrylates, tri(meth)acrylates, tetra(meth)acrylates, diallyl compounds, triallyl compounds and tetraallyl compounds. Preference is given to divinylbenzene, divinyl adipate, ethylene glycol di(meth)acrylates, diethylene glycol di(meth)acrylate, triethylene glycol di(meth)acrylate, polyethylene glycol di(meth)acrylate, polypropylene glycol di(meth)acrylate, neopentyl glycol di(meth)acrylate, 1,3-butylene glycol di(meth)acrylate, 1,3-butyl di(meth)acrylate, hexanediol di(meth)acrylate, 1,3-butanediol di(meth)acrylate, trimethylolethane tri(meth)acrylate, trimethylolpropane tri(meth)acrylate, dipentaerythrityl tri(meth)acrylate, diallyl phthalate, triallyl dicyanurate and tetraallyloxyethane. Particular preference is given to trimethylolethane tri(meth)acrylate, hexanediol di(meth)acrylate and 1,3-butanediol di(meth)acrylate.

For preparation of the organopolymers b), preferably 65 to 98% by weight, more preferably 85 to 97% by weight and most preferably 90 to 97% by weight of monomers α) are used, based in each case on the total weight of the monomers for preparation of the organopolymers b). The monomers α) used are preferably 50 to 100% by weight, more preferably 80 to 100% by weight, of methacrylic esters or acrylic esters, based in each case on the total weight of the monomers α) used for preparation of the organopolymers b). The monomers β) are used preferably to an extent of 0.1 to 15% by weight, more preferably to an extent of 0.3 to 10% by weight, even more preferably to an extent of 1 to 9% by weight and most preferably to an extent of 1.5 to 9% by weight, based in each case on the total weight of the monomers for preparation of the organopolymers b). The organopolymers b) contain units of monomers α) and β) preferably to an extent of at least 92% by weight, more preferably to an extent of at least 95% by weight, even more preferably to an extent of at least 97% by weight and most preferably to an extent of at least 98% by weight, based in each case on the total weight of the monomers for preparation of the organopolymers b). The monomers γ) are used preferably to an extent of 0.1 to 10% by weight, more preferably to an extent of 0.1 to 5% by weight and most preferably to an extent of 0.1 to 3% by weight, based in each case on the total weight of the monomers for preparation of the organopolymers b). The organopolymers b) contain units of one or more monomers γ) especially if the organopolymers b) contain more than 4.5% by weight, or more than 4.0% by weight or more than 3.0% by weight, based on the total weight of the organopolymers b), of ethylenically unsaturated carboxylic acids β). It will be appreciated that the organopolymers b), however, may also contain units of monomers γ) when the organopolymers b) contain, for example, less than 3.0% by weight of monomers β).

The monomers δ) include, for example, one or more ethylenically unsaturated silanes, such as (meth)acryloyloxypropyltri(alkoxy)silanes or (meth)-acryloyloxypropyldialkoxymethylsilanes, vinyltrialkoxy-silanes or vinylmethyldialkoxysilanes, where the alkoxy groups present may, for example, be methoxy, ethoxy, propoxy, butoxy, acetoxy and ethoxy propylene glycol ether radicals. Preferred ethylenically unsaturated silanes are vinyltrimethoxysilane, vinylmethyl-dimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, 3-methacryloyloxypropylmethyltrimethoxysilane, 3-methacryloyloxypropylmethyldimethoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexyloxysilane, vinyltrioctyloxysilane, vinyldimethoxyoctyloxysilane, vinylmethoxydioctyloxysilane, vinylmethoxydilauryloxysilane, vinyldimethyloxylauryloxysilane, and also polyethylene glycol-modified silanes. Particularly preferred ethylenically unsaturated silanes are vinyl-trimethoxysilane, vinylmethyldimethoxysilane, vinyl-triethoxysilane, vinylmethyldiethoxysilane, vinyltris(1-methoxy) isopropoxysilane, methacryloyloxypropyltris(2-methoxyethoxy)silane, 3-methacryloyl-oxypropyltrimethoxysilane, 3-methacryloyloxypropylmethyldimethoxysilane and methacryloyloxymethyltrimethoxy-silane. The ethylenically unsaturated silanes preferably do not have any hydrophilic groups.

Preferably 0 to 5% by weight, more preferably 0.1 to 3% by weight and most preferably 0.2 to 1.5% by weight of ethylenically unsaturated silanes are used, based in each case on the total weight of the monomers for preparation of the organopolymers b). The use of the ethylenically unsaturated silanes can, for example, improve the water or alkali resistance of the composite particles.

In addition, the monomers δ) also include 0 to 10% by weight, based on the total weight of the monomers for preparation of the organopolymers b), of auxiliary monomers, for example ethylenically unsaturated carboxamides and carbonitriles, preferably acrylamide and acrylonitrile; diesters of fumaric acid and maleic acid, such as the diethyl and diisopropyl esters; carboxylic anhydrides such as maleic anhydride; ethylenically unsaturated sulfonic acids or salts thereof, preferably vinylsulfonic acid, 2-acrylamido-2-methylpropanesulfonic acid; ethylenically unsaturated epoxides such as glycidyl methacrylate or glycidyl acrylate; ethylenically unsaturated hydroxyl or keto compounds, for example hydroxyalkyl methacrylates and acrylates, such as hydroxyethyl, hydroxypropyl or hydroxybutyl acrylate or hydroxyethyl, hydroxypropyl or hydroxybutyl methacrylate, and compounds such as diacetoneacrylamide and acetylacetoxyethyl acrylate or methacrylate; or vinyl ethers such as methyl, ethyl or isobutyl vinyl ether. The auxiliary monomers have preferably 1 to 12 carbon atoms, more preferably 1 to 8 carbon atoms and most preferably 1 to 6 carbon atoms.

Examples of suitable organopolymers b) are (meth)acrylate polymers, styrene-(meth)acrylate polymers, vinyl ester polymers, each of which contain one or more different units of ethylenically unsaturated carboxylic acids β) and optionally one or more different units of the monomers γ) and/or of the monomers δ); with the provisos that the organopolymers b) contain at least 92% by weight of units of monomers α) and β), and that the organopolymers b) contain units of one or more monomers γ) if the organopolymers b) contain more than 4.5% by weight of ethylenically unsaturated carboxylic acids β); where the figures in % by weight are each based on the total weight of the organopolymers b).

Preferred organopolymers b) are polymers of vinyl esters, especially vinyl acetate, with 1 to 15% by weight of ethylenically unsaturated carboxylic acids β), such as acrylic acid or methacrylic acid, and optionally 0.1 to 5% by weight of monomers γ), such as trimethylolethane trimethacrylate, and optionally 0.1 to 5% by weight of ethylenically unsaturated silanes, such as vinyltrimethoxysilane, vinyltriethoxysilane, vinylmethyldimethoxysilane or vinylmethyldieth-oxysilane, where auxiliary monomers may optionally also be present in the abovementioned amounts; with the provisos that the organopolymers b) contain at least 92% by weight of units of the monomers α) and β), and that the organopolymers b) contain units of one or more monomers γ) if the organo-polymers b) contain more than 4.5% by weight of ethylenically unsaturated carboxylic acids β); where the figures in % by weight add up to 100% by weight in each case.

Preferred organopolymers b) are also polymers of (meth) acrylic esters, such as methyl(meth)acrylate and/or n-butyl (meth)acrylate, with 1 to 15% by weight of ethylenically unsaturated carboxylic acids β) such as acrylic acid or methacrylic acid, and optionally 0.1 to 5% by weight of monomers γ), such as trimethylolethane trimethacrylate, and optionally 0.1 to 5% by weight of ethylenically unsaturated silanes, such as vinyltrimethoxysilane, vinyltriethoxysilane, vinylmethyldimethoxysilane or vinylmethyldiethoxysilane, where auxiliary monomers may optionally also be present in the abovementioned amounts; with the provisos that the organopolymers b) contain at least 92% by weight of units of the monomers α) and β), and that the organopolymers b) contain units of one or more monomers γ) if the organopolymers b) contain more than 4.5% by weight of ethylenically unsaturated carboxylic acids β); where the figures in % by weight add up to 100% by weight in each case.

For production of the composite particles, the organo-polymers b) are used preferably to an extent of 19 to 90% by weight, more preferably 30 to 80% by weight and most preferably 50 to 70% by weight, based in each case on the total mass of components a), b) and c) for production of the composite particles.

The monomers and the proportions by weight of the comonomers are selected so as to result generally in a glass transition temperature Tg of −50° C. to +70° C., preferably −30° C. to +50° C. and more preferably of −20° C. to +30° C.

The glass transition temperature Tg of the polymers can be determined in a known manner by means of differential scanning calorimetry (DSC). The Tg can also be calculated approximately in advance by means of the Fox equation. According to Fox T. G., Bull. Am. Physics Soc. 1, 3, page 123 (1956): $1/Tg = x1/Tg1 + x2/Tg2 + \ldots + xn/Tgn$, where xn is the mass fraction (% by weight/100) of monomer n, and Tgn is the glass transition temperature in kelvin of the homopolymer of monomer n. Tg values for homopolymers are listed in Polymer Handbook 2nd edition, J. Wiley & Sons, New York (1975).

The organopolymers b) can be prepared by free-radical polymerization known to those skilled in the art, for example suspension, solution, bulk or, preferably, mini-emulsion and emulsion polymerization processes, as described, for example, in DE-A 102006050336. The emulsion polymerization process is preferably performed at a pH between 3 and 6. The organopolymers b) are preferably stabilized by the standard ionic or non-ionic emulsifiers, typically in amounts of 1 to 5% by weight based on the amount of monomer. Examples of suitable emulsifiers are anionic surfactants, such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

The use of protective colloids, such as polyvinyl alcohol, is less preferred in some cases, since they can adversely affect the water resistance of the composite particles or application products thereof. Preferably, the organopolymers b) are prepared using less than 3% by weight of protective colloids, based on the amount of monomer. Particular preference is given to using no protective colloids.

For production of the composite particles, the coupling reagents c1) used may, for example, be one or more functionalized alkylalkoxysilanes of the general formula $$(R^2O)_n Si(R^3X)_{4-n} \qquad (II)$$

in which $R^2$ may be as defined above for formula I, $R^3$ is an optionally substituted alkylene radical having 1 to 20 carbon atoms, preferably having 1 to 6 carbon atoms, in which nonadjacent methylene units may be replaced by oxygen, and X is bonded to $R^3$ via a covalent bond and is an amino radical —$NHR^4$, an epoxy radical —$CR^5(O)CR^6R^7$ or an isocyanate radical —NCO, where $R^4$ is a hydrogen atom or an optionally substituted alkyl, aryl or aminoalkyl radical having 1 to 10 carbon atoms, $R^5$, $R^6$, $R^7$ are each a hydrogen atom or an optionally substituted alkyl or aryl radical having 1 to 10 carbon atoms, where the particular $R^2$, $R^3$, $R^4$, $R^5$, $R^6$ and $R^7$ radicals each assume their values independently of one another, and where $R^3X$ is bonded to the silicon atom of the formula II via a carbon atom of the $R^3$ radical.

For the functionalized alkylalkoxysilanes of the formula II, suitable, preferred and particularly preferred $R^2$ radicals are the same radicals which are listed correspondingly as $R^2$ radicals for the silicon oxides.

The $R^3$ radicals of the $R^3X$ group of the functionalized alkylalkoxysilanes of the formula II are preferably unsubstituted. $R^3$ is more preferably an alkylene radical having 1 to 6 carbon atoms, most preferably methylene, ethylene or propylene.

R⁴ is preferably a hydrogen atom, an alkyl, aryl or aminoalkyl radical having 1 to 6 carbon atoms, more preferably hydrogen atom, 2-aminoethyl, phenyl, cyclo-hexyl, methyl, ethyl, propyl or butyl. The $R^5$, $R^6$, $R^7$ radicals are preferably each a hydrogen atom.

The individual R, $R^1$, $R^2$, $R^3$, $R^4$, $R^5$, $R^6$, $R^7$ and X radicals and the values x, y, n in the compounds of the formulae I and II are each defined independently of one another. In all embodiments of the formulae I and II, the silicon atom is tetravalent in each case.

Preference is given to using aminoalkylenetrialkoxy-silanes of the formula II and glycidoxyalkylenetrialkoxy-silanes of the formula II. Examples of preferred functionalized alkylalkoxysilanes of the formula II are (3-aminopropyl)triethoxysilane, (3-aminopropyl)-trimethoxysilane, N-(2-aminoethyl)(3-aminopropyl)-triethoxysilane, N-(2-aminoethyl)(3-aminopropyl)-trimethoxysilane, N-(2-aminoethyl)(3-aminopropyl)methyl-dimethoxysilane, N-cyclohexylaminomethylmethyl-diethoxysilane, (3-glycidoxypropyl)triethoxysilane, 3-glycidoxypropyl)trimethoxysilane. Preference is given to (3-aminopropyl)triethoxysilane and 3-glycid-oxypropyl)triethoxysilane. Particular preference is given to epoxy radicals such as (3-glycidoxypropyl)-triethoxysilane.

For production of the composite particles, the coupling reagents c1) are used preferably to an extent of 0.1 to 15% by weight, more preferably 0.5 to 10% by weight and most preferably 1 to 5% by weight, based in each case on the total mass of components a), b) and c1) for production of the composite particles.

For the coupling reagents c2), the unsaturated alkoxy-silanes used may, for example, be one or more compounds of the general formula $R^8SiR^9_{0-2}(OR^{10})_{1-3}$ where $R^9$ is a $C_1$- to $C_3$-alkyl radical, $C_1$- to $C_3$-alkoxy radical or halogen (e.g. Cl or Br), $R^8$ is defined as $CH_2=CR^{11}-(CH_2)_{0-1}$ or $CH_2=CR^{11}CO_2(CH_2)_{1-3}$, $R^{10}$ is an unbranched or branched optionally substituted alkyl radical having 1 to 12 carbon atoms, preferably 1 to 3 carbon atoms, or an acyl radical having 2 to 12 carbon atoms, where $R^{10}$ may optionally be interrupted by an ether group, and $R^{11}$ is H or $CH_3$.

Preference is given to γ-acryloyl- or γ-methacryloyloxy-propyltri(alkoxy)silanes, α-methacryloyloxymethyltri(alkoxy)silanes, γ-methacryloyloxypropylmethyldi(alkoxy)silanes, vinylalkyldi(alkoxy)silanes and vinyltri(alkoxy)silanes, where the alkoxy groups used may, for example, be methoxy, ethoxy, methoxyethylene, ethoxyethylene, methoxypropylene glycol ether or ethoxypropylene glycol ether radicals. Examples of suitable unsaturated alkoxysilanes are vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, 3-methacryloyl-oxypropyltrimethoxysilane, 3-methacryloyloxypropyl-methyldimethoxysilane, methacryloyloxymethyltrimethoxy-silane, 3-methacryloyloxypropyl-tris(2-methoxyethoxy)-silane, vinyltrichlorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexyloxysilane, vinyltrioctyloxysilane, vinyldimethyloctyloxysilane, vinylmethoxydioctyloxysilane, vinylmethoxydilauryloxysilane, vinyldimethoxylauryloxy-silane, and also polyethylene glycol-modified silanes.

The most preferred unsaturated alkoxysilanes are vinyltrimethoxysilane, vinylmethyldimethoxysilane, vinyl-triethoxysilane, vinylmethyldiethoxysilane, vinyltris-(1-methoxy)isopropoxysilane, methacryloyloxypropyl-tris(2-methoxyethoxy)silane, 3-methacryloyloxypropyl-trimethoxysilane, 3-methacryloyloxypropylmethyl-dimethoxysilane and methacryloyloxymethyltrimethoxy-silane.

In the case of use of the coupling reagents c2), preferably 0.1 to 12% by weight, more preferably 0.2 to 10% by weight and most preferably 0.5 to 9% by weight of unsaturated alkoxysilanes are used, based in each case on the weight of the oxide particles a).

In the case of the coupling reagents c2), the functional groups of the ethylenically unsaturated organomonomers are preferably selected from the group comprising carboxylic acid groups or derivatives thereof, such as esters, amides, nitriles or anhydrides, sulfo, epoxy and hydroxyl groups.

Examples of ethylenically unsaturated organomonomers are ethylenically unsaturated mono- and dicarboxylic acids, preferably acrylic acid, methacrylic acid, fumaric acid and maleic acid; ethylenically unsaturated carboxamides and carbonitriles, preferably acrylamide, diacetoneacrylamide and acrylonitrile; mono- and diesters of fumaric acid and maleic acid, such as the diethyl and diisopropyl esters, and maleic anhydride, ethylenically unsaturated sulfonic acids or salts thereof, preferably vinylsulfonic acid, 2-acrylamido-2-methylpropanesulfonic acid; ethylenically unsaturated epoxides such as glycidyl methacrylate or glycidyl acrylate; ethylenically unsaturated hydroxyl compounds, for example hydroxyalkyl methacrylates and acrylates, such as hydroxyethyl, hydroxypropyl or hydroxybutyl acrylate or hydroxyethyl, hydroxypropyl or hydroxybutyl methacrylate. Preference is given to ethylenically unsaturated epoxides such as glycidyl methacrylate or glycidyl acrylate, and diacetoneacrylamide.

The coupling reagents c2) contain preferably 0.1 to 12% by weight, more preferably 0.2 to 8% by weight and most preferably 0.5 to 5% by weight of ethylenically unsaturated organomonomers, based in each case on the weight of the organopolymers b).

The coupling reagents c2) may optionally additionally include one or more further ethylenically unsaturated monomers, for example the suitable preferred and more preferred monomers listed above as monomers α), monomers γ) or auxiliary monomers. Preference is given here to the monomers γ).

The coupling reagents c2) may contain the further ethylenically unsaturated monomers, for example, to an extent of 0 to 10% by weight and preferably to an extent of 0.1 to 5% by weight, based in each case on the total weight of the oxide particles a) and of the organopolymers b).

The composite particles have mean particle sizes of preferably 20 nm to 1000 nm, more preferably of 40 to 800 nm and most preferably of 60 to 300 nm. The inorganic domains of the composite particles have mean particle sizes of preferably 2 nm to 500 nm, more preferably of 5 nm to 100 nm and most preferably of 10 nm to 70 nm (determined with the Libra 120 transmission electron microscope from Zeiss). The composite particles have a viscosity of ≤9000 mPas (determined with a Brookfield viscometer to ISO 2555 at a temperature of 23° C. using a dispersion of the composite particles in water with a solids content of 30%). The glass transition temperature Tg of the composite particles is preferably −50 to 110° C. and more preferably −40 to 70° C. (determined by means of differential scanning calorimetry (DSC)).

The invention further provides processes for producing composite particles by means of conversion of a) one or more oxide particles, b) one or more organopolymers and c) one or more coupling reagents.

The solvents used for the process may be water or an organic solvent, optionally in combination with water, or a solvent mixture composed of several organic solvents, optionally in combination with water. Examples of organic solvents are alcohols having 1 to 6 carbon atoms, especially methanol, ethanol, n-propanol and isopropanol. The preferred solvent is water, optionally in combination with one or more organic solvents. Particular preference is given to water.

The temperature is preferably 20 to 100° C., more preferably 30 to 90° C. and most preferably 40 to 85° C. The reaction time is preferably 1 to 48 hours, more preferably 1 to 12 hours.

The oxide particles a), the organopolymers b) and the coupling reagents c) can be used in pure form or in a solvent. Preference is given to using the oxide particles a) and the soluble organopolymers b) in a solvent, and the coupling reagents c) in pure form. Components a), b) and c) can be mixed or initially charged in any desired manner. For instance, components a), b) and c) can be initially charged fully in a solvent. Alternatively, a portion of components a), b) and/or c) can be initially charged, and the remainder of components a), b) and/or c) can be added during the performance of the process. In a preferred variant, the oxide particles a) and the organopolymers b) are fully initially charged and mixed, and the coupling reagents c) are added subsequently. In a further alternative, it is also possible first to mix the oxide particles a) with coupling reagents c) and separately to mix organopolymers b) with coupling reagents c) and then to mix these separately prepared mixtures with one another.

In the case of coupling reagents c2), the silicon particles a), the organopolymers b) and the alkylalkoxy-silanes and the ethylenically unsaturated organomonomers are preferably initially charged; alternatively, it is also possible first to mix the oxide particles a) with alkylalkoxysilanes, and separately to mix organopolymers b) with ethylenically unsaturated organomonomers, and then to mix these separately prepared mixtures with one another. The mixtures of components a), b) and c2) thus prepared are stirred, for example, at 30 to 100° C., preferably for 30 min to 12 hours; and then any initiators and any further ethylenically unsaturated monomers are added and stirred at preferably 30 to 100° C. for a further 30 min to 12 hours. Examples of initiators are the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide, azobisisobutyronitrile, diacetyl peroxydicarbonate, dicyclohexyl peroxydicarbonate, dibenzoyl peroxide.

In the case of use of the coupling reagents c1), the conversion of components a), b) and c) for production of the composite particles is generally effected by a condensation reaction. A condensation reaction is a chemical conversion of molecules with discharge of a small molecule, for example water, alcohol, hydrogen halide or ammonia, and formation of a covalent bond. In the case of use of coupling reagents c1), the conversion of components a), b) and c) for production of the composite particles is generally effected by means of a free-radical initiated polymerization.

In the production of the composite particles, the pH is generally between 2 and 12. Preferred pH values are between 8 and 12, and most preferred pH values are between 8 and 10. Preference is also given to pH values between 2 and 5. The pH can be adjusted in a known manner by organic or inorganic acids, bases or buffers, for example by addition of hydrochloric acid, ammonia, amines or alkali metal hydroxides, for example sodium hydroxide solution.

In the process according to the invention, it is additionally possible to add emulsifiers, for example 1 to 5% by weight of emulsifiers, based on the total mass of components a), b) and c). Suitable and preferred emulsifiers are, for example, the same as have already been listed correspondingly above for the polymerization for preparation of the organopolymers b). For stabilization of the individual components, however, the amounts of emulsifiers which are typically present in the organopolymers b) as a constituent are generally sufficient. Preference is given to using no additional emulsifiers in the process for production of the composite particles. Preferably, no protective colloids are present in the process for production of the composite particles.

The composite particles thus obtainable are in the form of a dispersion and preferably have a solids content of to 65% by weight, more preferably of 25 to 55% by weight and most preferably of 35 to 45% by weight.

After conclusion of the chemical conversion of components a), b) and c), the mixture is preferably neutralized, for example by addition of the aforementioned acids, bases or buffers, preferably by addition of ammonia or amines.

After conclusion of the chemical conversion of components a), b) and c), by-products, unconverted starting materials, solvents or other volatile substances can be removed by means of distillation, preferably under reduced pressure, and optionally while passing entraining gases through or over, such as air, nitrogen or water vapour.

For production of the composite particles in the form of powders, the dispersions of the composite particles are dried, optionally with addition of protective colloids as a drying aid. Suitable drying processes are, for example, fluidized bed drying, roller drying, freeze drying or spray drying. Suitable drying assistants are, for example, polyvinyl alcohols. The aqueous mixtures are preferably spray-dried. The spray drying is effected in customary spray drying systems, and the atomization can be effected by means of one-, two- or multi-substance nozzles, or with a rotating disk. The exit temperature is generally selected within the range from 45° C. to 120° C., preferably between 60° C. and 90° C. The composite particles thus obtained are redispersible in water.

For the drying, a content of up to 1.5% by weight of antifoam, based on the polymeric constituents, has been found to be favourable in many cases. To increase the storability by improving the blocking stability, especially in the case of powders with low glass transition temperature, the resulting powder can be modified with an antiblocking agent (anticaking agent), preferably up to 30% by weight, based on the total weight of polymeric constituents. Examples of antiblocking agents are calcium carbonate or magnesium carbonate, talc, gypsum, silicas, for example finely divided silicas, kaolins, metakaolin, calcined kaolin, silicates with particle sizes preferably in the range from 10 nm to 100 μm.

To improve the performance properties, further additives can be added to the composite particles. Further constituents present in the composite particles in preferred embodiments are, for example, binders, pigments, fillers, for example zeolites, foam stabilizers, hydrophobing agents or air pore formers. These additives are preferably added during or after the drying of the dispersion.

Advantageously, the inventive composite particles are stable in organic solvents, reactive diluents or water, or in the form of powders, and do not tend to aggregate or separate, even without addition of stabilizers, emulsifiers or protective colloids. In addition, the inventive composite particles, even with a high solids content, have a low viscosity, which is advantageous for the further processing and application of the composite particles. The inventive composite particles are also water-resistant, even at acid or basic pH values.

The composite particles are suitable as binders, cobinders or additives for improving the performance properties of many kinds of products. Use of the composite particles in coating materials or adhesives allows, for example, the thermal stability or scratch resistance thereof to be enhanced. Adhesives comprising composite particles frequently additionally exhibit improved flow characteristics and a stable modulus of elasticity at elevated temperature, and give rise on application, for example, to removable adhesive films. With coating materials comprising composite particles, it is possible to provide coatings with a matt effect. It is equally possible to use the composite particles in formulations for renders, exterior paints, powder coatings, polymer materials and composite materials, for example for production of polymer components, composite components or packaging materials. The composite particles are also suitable for surface treatment for synthetic or natural materials, such as fibers or particles, such as preferably stone, wood, leather, paper, textiles, plastics, such as polymer films. In this case, the composite particles act, for example, as primers for promoting adhesion, as a barrier layer, to prevent corrosion or to repel soil. The soil-repellent effect can advantageously be exploited especially in corresponding applications in carpets, including fitted carpets. The composite particles can also be used to produce low-combustibility coatings for wood, plastics, leather and paper. Stone can be reinforced or renovated. In products in the packaging industry, addition of the composite particles can generate a gas barrier.

The composite particles thus obtained in the form of powders or in the form of dispersions can also be blended with conventional polymers, for example organopolymers b), and sent in this form to the aforementioned uses.

The examples which follow serve to illustrate the invention in detail, and should in no way be interpreted as a restriction.

Preparation of Silica a):

1020 g of tetraethoxysilane (Silicat TES 28; tradename from Wacker Chemie) and 30 g of trimethylethoxysilane (Silane M3-Etoxy; tradename from Wacker Chemie) were added to 3000 g of water, homogenized by stirring and adjusted to a pH of 9 by means of an aqueous ammonia solution. The mixture was heated to 30° C. and stirred at 30° C. for 10 h. Subsequently, the volatile components and a portion of the water were distilled off at 60° C. under reduced pressure. Cooling to room temperature was followed by filtration (mesh size 70 micrometers). A transparent aqueous hydrolysis product with a solids content of 40% was obtained.

Preparation of the Organopolymers b):

Polymer 1 (Pol-1):

A reactor with a capacity of 3 liters was initially charged with 640 g of deionized water, 3.1 g of sodium laurylsulfate, 0.93 g of potassium peroxodisulfate under a nitrogen atmosphere, and heated to 40° C. while stirring. On attainment of 40° C., solution 1 was added to the reactor.

Subsequently, the temperature was increased to 80° C. On attainment of this temperature, spatially separate addition of an initiator solution (0.93 g of potassium peroxodisulfate in 98 g of water) and solution 2 to the reactor was commenced. The initiator solution was metered in within 3 hours, and solution 2 over the course of 2.5 hours.

Solution 1:
vinyltriethoxysilane: 0.74 g
methacrylic acid: 7.42 g
styrene: 14.83 g
butyl acrylate: 81.62 g
methyl methacrylate: 43.63 g
trimethylolpropane trimethacrylate (TMPTMA): 0.14 g
dodecyl mercaptan: 1.00 g Solution 2:
vinyltriethoxysilane: 2.36 g
methacrylic acid: 23.48 g
styrene: 46.97 g
butyl acrylate: 258.48 g
methyl methacrylate: 138.17 g
trimethylolpropane trimethacrylate (TMPTMA): 0.14 g
dodecyl mercaptan: 0.46 g The end of the metered additions was followed by stirring at 80° C. for 2 hours and at 85° C. for 1 hour. The pH was kept between 3 and 5 during the polymerization by, if required, adding appropriate amounts of aqueous ammonia solution.

Subsequently, the polymer dispersion was diluted with water and the pH was adjusted to 9 with an aqueous ammonia solution (12.5%). A polymer solution with a solids content of 40% was obtained.

(Comparative) polymers 2 to 6 ((C)Pol-2 to 6):

Analogous to polymer 1, except that different monomer compositions were used (see table 1).

TABLE 1

Composition of organopolymers b):

| | Pol-1 | Pol-2 | Pol-3 | Pol-4 | CPol-5 | CPol-6 |
|---|---|---|---|---|---|---|
| vinyltriethoxysilane | 0.5% | 0.0% | 0.0% | 0.0% | 0.5% | 0.5% |
| methacrylic acid | 5.0% | 5.0% | 8.0% | 2.9% | 15.0% | 10.0% |
| styrene | 10.0% | 10.0% | 10.0% | 10.0% | 10.0% | 10.0% |
| butyl acrylate | 55.0% | 55.0% | 55.0% | 61.3% | 55.0% | 55.0% |
| methyl methacrylate | 29.4% | 29.9% | 25.5% | 25.8% | 19.5% | 24.5% |
| TMPTMA[a] | 0.1% | 0.1% | 1.5% | 0.0% | 0.0% | 0.0% |
| viscosity[b] [mPas] | 2500 | 2350 | 3800 | 650 | gel | 7048 |

The percentages in table 1 are figures in percent by weight and are based on the total mass of the respective organopolymer;

[a] TMPTMA = trimethylolpropane trimethacrylate

[b] Brookfield viscosity determined to EN ISO 2555 at 20 revolutions and 23° C. using the respective dispersion with a solids content of 40% and a pH of 9.

Production of the Composite Particles

(Comparative) Examples 1 to 6 ((C)Ex. 1 to 6)

Epoxy-Functionalized Silane as Coupling Reagent c1

While stirring, 1000 g of the respective polymer solution of (comparative) polymers 1 to 6 (solids content in each case 40% and pH in each case 9) were, if appropriate, mixed with 670 g of the above-described silica a) (solids content of 40%, pH 9) according to the information in table 2. After the homogenization, if appropriate, 22 g of Geniosil GF 82 ((3-glycidoxypropyl)triethoxysilane; tradename from Wacker Chemie) were added. Subsequently, the mixture was stirred at 30° C. for 4 h and then at 60° C. for 2 h.

Thereafter, volatile components were distilled off at 60° C. under reduced pressure. After cooling to room temperature, the dispersion thus obtained was filtered (mesh size 70 micrometers). The solids content of the composite dispersion was 40%.

TABLE 2

Composition of composite particles:

|  | Ex. 1 | Ex. 2 | Ex. 3 | Ex. 4 | CEx. 5 | CEx. 6 |
|---|---|---|---|---|---|---|
| silica a)[1] | + | + | + | + | − | + |
| organopolymer b) | Pol-1 | Pol-2 | Pol-3 | Pol-4 | CPol-5 | CPol-6 |
| Geniosil GF 82[1] | + | + | + | + | − | + |
| viscosity[3] [mPas] | 1200 | 1350 | 2800 | 150 | n.d.[2] | 6800 |
| stability test | + | + | + | + | n.d.[2] | + |
| water resistance | + | + | + | + | n.d.[2] | − |

[1]+: the respective component was used in the respective example; −: the respective component was not used in the respective example;
[2]the product was in the form of a gel, and so the parameters were not determinable.
[3]Brookfield viscosity determined to EN ISO 2555 at 20 revolutions and 23° C. using the respective dispersion with a solids content of 40% and a pH of 9.

(Comparative) Examples 7 to 10 ((C)Ex. 7 to 10)

Ethylenically Unsaturated Silane and Ethylenically Unsaturated Epoxide as Coupling Reagent c2

While stirring, 1000 g of the respective polymer solution of (comparative) polymers 1 to 6 (solids content in each case 40% and pH in each case 9) and 670 g of the above-described silica a) (solids content of 40%, pH 9) and, if appropriate, 4 g of Geniosil GF 31 ((3-methacryloyloxypropyl)trimethoxysilane, trade-name from Wacker Chemie) and, if appropriate, 4 g of glycidyl methacrylate were mixed, according to the information in table 3. The homogenization was followed by stirring at 60° C. for 3 h. Subsequently, 10 g of potassium peroxodisulfate (3% solution) and 2 g of trimethylolpropane trimethacrylate (TMPTMA) were added to the reactor and the temperature was increased to 75° C. After about 2 hours, the respective composite dispersion was cooled to room temperature.

TABLE 3

Composition of composite particles:

|  | Ex. 7 | CEx. 8 | CEx. 8 | CEx. 10 |
|---|---|---|---|---|
| silica a)[1] | + | + | + | + |
| organopolymer b) | Pol-4 | Pol-4 | CPol-6 | CPol-6 |
| Geniosil GF 31[1], [2] | + | − | + | − |
| glycidyl methacrylate[1] | + | − | + | − |
| viscosity[3] [mPas] | 190 | 120 | 5 250 | 5 850 |
| stability test | + | − | + | − |
| water resistance | + | + | − | − |

[1]+: the respective component was used in the respective example; −: the respective component was not used in the respective example;
[2]Geniosil GF 31 = (3-methacryloyloxypropyl)trimethoxysilane;
[3]Brookfield viscosity determined to EN ISO 2555 at 20 revolutions and 23° C. using the respective dispersion with a solids content of 40% and a pH of 9.

Testing of the Composite Particles

Stability Test:

The respective dispersion of the composite particles of the (comparative) examples was diluted to a solids content of 10% by weight by adding water and adjusted to a pH of 9 with aqueous ammonia solution. The respective dispersion was introduced into a measuring cylinder, sealed and stored under standard conditions according to DIN50014. After 4 weeks under standard conditions according to DIN 50014, the dispersions were qualitatively assessed visually:

(+) stable dispersion, no sediment formation;
(−) unstable dispersion, sediment formation.

Water Resistance:

The respective dispersion of the composite particles of the (comparative) examples, 24 h after production thereof, was applied to a glass plate with a coating bar (wet film thickness 100 micrometers) and dried under standard conditions according to DIN50014 for 24 h. Subsequently, water droplets were applied to the dry films thus obtained. The samples were covered with a watchglass. After 24 hours under standard conditions according to DIN50014, the sites to which water had been applied were qualitatively assessed visually as follows:

(+) no change;
(−) change in the form of swelling or bubble formation.

It is clear from the tests (see information in tables 2 and 3) that the inventive composite particles are stable even after long storage times. Films produced from the inventive composite particles are water-resistant. In addition, the inventive composite particles have low viscosities compared to the noninventive composite particles, which facilitates the handling and processability of the inventive composite particles. The inventive composite particles can accordingly, for example, also be used in the form of dispersions with higher solids contents, which makes the transport of the dispersions or else the drying of the dispersions more efficient.

The invention claimed is:

1. Composite particles obtained by conversion of a) one or more inorganic oxides having a mean diameter of <1000 nm, b) one or more organopolymers and c) one or more coupling reagents, said inorganic oxides a) and organopolymers b) being joined to one another via units of coupling reagents c), wherein the organopolymers b) used are one or more polymers of
   α) one or more ethylenically unsaturated monomers selected from the group consisting of vinyl esters of carboxylic acids having 1 to 15 carbon atoms, methacrylic esters or acrylic esters of carboxylic acids with unbranched or branched alcohols having 1 to 15 carbon atoms and olefins, vinylaromatics and vinyl halides, and
   β) one or more ethylenically unsaturated carboxylic acids having 3 to 11 carbon atoms, and optionally γ) one or more monomers containing at least two ethylenically unsaturated groups and optionally δ) one or more further ethylenically unsaturated monomers, with the provisos that the organopolymers b) contain at least 91% by weight of units of monomers α) and β), and that the organopolymers b) contain units of one or more monomers γ) if the organopolymers b) contain more than 4.9% by weight of units of the ethylenically unsaturated carboxylic acids β), where the figures in % by weight are based in each case on the total weight of the organopolymers b), and the coupling reagents c) are selected from the group consisting of c1) one or more alkylalkoxysilanes whose alkyl groups have at least one amino, epoxy, mercapto or isocyanate group, and c2) one or more unsaturated alkoxysilanes and additionally one or more ethylenically unsaturated organomonomers containing at least one functional group selected from the group consisting of carboxylic acid groups or derivatives thereof, sulfo groups, epoxy groups and hydroxyl groups.

2. The composite particles as claimed in claim 1, wherein the inorganic oxides a) used are one or more silicon oxides consisting of units of the general formula

   (I)

in which x is 0, 1, 2 or 3 and y is 0, 1 or 2, with the proviso that the sum of x+y≤3, $R^1$ is an SiC-bonded monovalent hydrocarbyl radical having 1 to 18 carbon atoms, $R^2$ is a hydrogen atom or a hydrocarbyl radical which has 1 to 18 carbon atoms and may be interrupted by one or more separate oxygen atoms, or a radical of the formula —$COCH_3$, —$COC_2H_5$ or —$CH_2CH_2OH$, where the individual $R^1$, $R^2$ and x and y are each defined independently of one another.

3. The composite particles as claimed in claim 1, wherein the organopolymers b) used are polymers of vinyl esters with 1 to 15% by weight of ethylenically unsaturated carboxylic acids β) and optionally 0.1 to 5% by weight of monomers γ) and optionally 0.1 to 5% by weight of ethylenically unsaturated silanes, with the provisos that the organopolymers b) contain at least 92% by weight of units of the vinyl esters and of the ethylenically unsaturated carboxylic acids β), and that the organopolymers b) contain units of one or more monomers γ) if the organopolymers b) contain more than 4.5% by weight of ethylenically unsaturated carboxylic acids β); where the figures in % by weight add up to 100% by weight in each case.

4. The composite particles as claimed in claim 1, wherein the organopolymers b) used are polymers of (meth)acrylic esters with 1 to 15% by weight of ethylenically unsaturated carboxylic acids β) and optionally 0.1 to 5% by weight of monomers γ) and optionally 0.1 to 5% by weight of ethylenically unsaturated silanes, with the provisos that the organopolymers b) contain at least 92% by weight of units of the (meth)acrylic esters and of the ethylenically unsaturated carboxylic acids β), and that the organopolymers b) contain units of one or more monomers γ) if the organo-polymers b) contain more than 4.5% by weight of ethylenically unsaturated carboxylic acids β); where the figures in % by weight add up to 100% by weight in each case.

5. The composite particles as claimed in claim 1, wherein the coupling reagents c1) used are one or more functionalized alkylalkoxysilanes of the general formula

   (II)

in which $R^2$ is a hydrogen atom or a hydrocarbyl radical having 1 to 18 carbon atoms, n is 1, 2 or 3, provided that at least one $R^2$ is said hydrocarbyl radical, $R^3$ is an optionally substituted alkylene radical having 1 to 20 carbon atoms, in which nonadjacent methylene units may be replaced by oxygen, and X is bonded to $R^3$ via a covalent bond and is an amino radical —$NHR^4$, an epoxy radical —$CR^5(O)CR^6R^7$ or an isocyanate radical —NCO, where $R^4$ is a hydrogen atom or an optionally substituted alkyl, aryl or aminoalkyl radical having 1 to 10 carbon atoms, $R^5$, $R^6$, $R^7$ are each a hydrogen atom or an optionally substituted alkyl or aryl radical having 1 to 10 carbon atoms, where the particular $R^2$, $R^3$, $R^4$, $R^5$, $R^6$ and $R^7$ radicals each assume their values independently of one another, and where $R^3X$ is bonded to the silicon atom of the formula II via a carbon atom of the $R^3$ radical.

6. The composite particles as claimed in claim 1, wherein the unsaturated alkoxysilanes used for the coupling reagents c2) are one or more compounds of the general formula $R^8SiR^9_{0-2}(OR^{10})_{1-3}$ where $R^9$ is a $C_1$- to $C_3$-alkyl radical, $C_1$- to $C_3$-alkoxy radical or halogen, $R^8$ is defined as $CH_2=CR^{11}—(CH_2)_{0-1}$ or $CH_2=CR^{11}CO_2(CH_2)_{1-3}$, $R^{10}$ is an unbranched or branched optionally substituted alkyl radical having 1 to 12 carbon atoms or an acyl radical having 2 to 12 carbon atoms, where $R^{10}$ may optionally be interrupted by an ether group, and $R^{11}$ is H or $CH_3$.

7. The composite particles as claimed in claim 1, wherein the ethylenically unsaturated organomonomers used for the coupling reagents c2) are ethylenically unsaturated mono- and dicarboxylic acids, ethylenically unsaturated carboxamides or carbonitriles, mono- or diesters of fumaric acid or maleic acid, ethylenically unsaturated sulfonic acids or salts thereof, ethylenically unsaturated epoxides or ethylenically unsaturated hydroxyl compounds.

8. The composite particles as claimed in claim 1, wherein the organopolymers b) contain units of one or more monomers γ) if the organopolymers b) contain more than 4.0% by weight, based on the total weight of the organopolymers b), of ethylenically unsaturated carboxylic acids β).

9. The composite particles as claimed in claim 1, wherein the organopolymers b) contain units of one or more monomers γ) if the organopolymers b) contain more than 3.0% by weight, based on the total weight of the organopolymers b), of ethylenically unsaturated carboxylic acids β).

10. A process for producing the composite particles as claimed in claim 1, by means of conversion of a) one or more inorganic oxides, b) one or more organopolymers and c) one or more coupling reagents.

11. The process as claimed in claim 10, wherein the organopolymers b) contain units of one or more monomers γ) if the organopolymers b) contain more than 4.0% by weight, based on the total weight of the organopolymers b), of ethylenically unsaturated carboxylic acids β).

12. The process as claimed in claim 10, wherein the organopolymers b) contain units of one or more monomers γ) if the organopolymers b) contain more than 3.0% by weight, based on the total weight of the organopolymers b), of ethylenically unsaturated carboxylic acids β).

13. A powder coating, coating composition, adhesive, or formulation for a polymer or composite material comprising the composite particles as claimed in claim 1 as a binder, cobinder or additive.

14. A method of treating a synthetic or natural material, comprising applying to the surface of the material the composite particles as claimed in claim 1.

15. The method of claim 14, wherein the synthetic or natural material is stone, wood, leather, paper, a textile or a plastic.

* * * * *

UNITED STATES PATENT AND TRADEMARK OFFICE
CERTIFICATE OF CORRECTION

PATENT NO. : 8,871,844 B2  
APPLICATION NO. : 13/509479  
DATED : October 28, 2014  
INVENTOR(S) : Abdulmajid Hashemzadeh Page 1 of 1

It is certified that error appears in the above-identified patent and that said Letters Patent is hereby corrected as shown below:

In the Claims

At column 18, line 29, "$R^8SiR^9_{0-2}(OR^{10})_{1-3}$" should read --$R^8SiR^9_{0-2}(OR^{10})_{1-3}$--

Signed and Sealed this  
Seventeenth Day of February, 2015

Michelle K. Lee  
*Deputy Director of the United States Patent and Trademark Office*